…

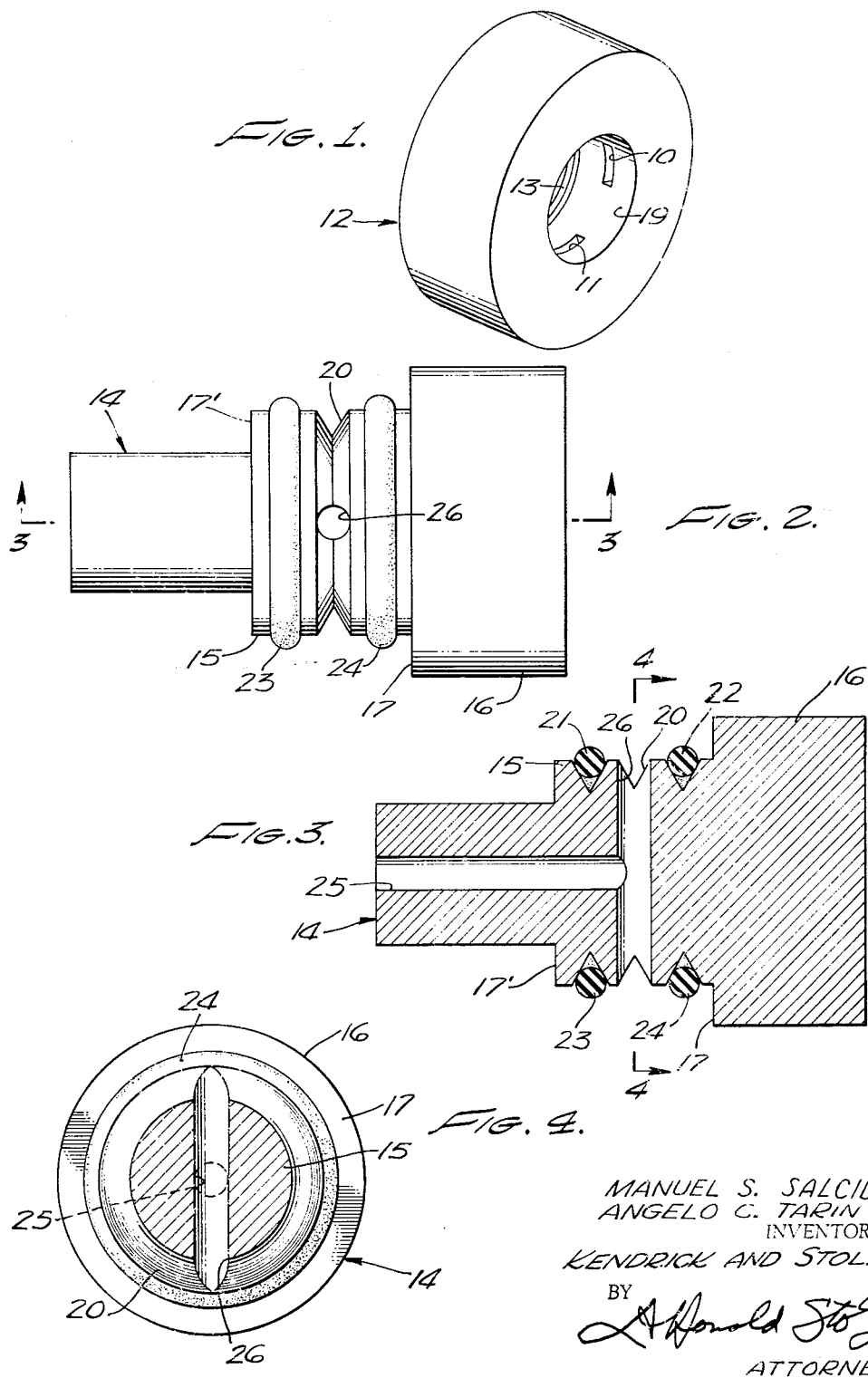

United States Patent Office 3,213,674
Patented Oct. 26, 1965

3,213,674
TOOL
Manuel S. Salcido, 206 S. Eastman, Los Angeles, Calif., and Angelo C. Tarin, 9458 Klinedale Ave., Downey, Calif.
Filed Aug. 15, 1962, Ser. No. 217,005
3 Claims. (Cl. 73—49.8)

This invention relates to the testing art, and more particularly to a device for use in testing fluidtight seals.

Although the device of the present invention may have a much larger scope of application and should not therefore be limited to that disclosed herein, it has been found to be especially useful in the testing of clutch plate seals in clutch drums of automatic transmissions for automobiles.

In the past, no means or convenient tool have been provided to test clutch plate seals. Thus, after a transmission has been taken apart, repaired and reassembled, it still may not operate satisfactorily due to defective clutch plate seals. This requires that the time consuming and expensive procedure of taking the transmission apart again be performed.

The present invention overcomes the above-described and other disadvantages of the prior art by providing a device to fit in a cylindrical passageway in a body such as a clutch drum, the passageway having circumferentially spaced holes therein. The holes may also be spaced from an end face of the clutch drum. A clutch plate provided in such a drum normally is spring biased and is provided with fluidtight seals. It is possible to determine whether or not the clutch plate seals are defective simply by introducing fluid under pressure through the said spaced holes and visually inspecting the clutch plate or the spring to determine whether or not either one of these structures move upon the introduction of fluid under pressure through the said spaced holes.

In accordance with the present invention, the device to be inserted in the pasageway may include a cylindrical member having a portion of a size to fit inside the passageway, and resilient means to seal the circumference of the member to the passageway at two axially spaced points along the length of the member. In such a case, the member may be provided with a hole through it extending from one end outwardly thereof at a position between the resilient means, thus fluid may be introduced into the space between the member and the passageway through the hole in the member after the member has been inserted in the passageway. Fluid in the space between the member and the passageway then will enter the said spaced holes in the passageway and move the clutch plate and its biasing spring if the clutch plate seals are not defective.

In accordance with a feature of the invention, stop means are provided on the member to engage the body at a position of the member in the passageway such that said resilient means are positioned on opposite sides of the said spaced holes in the passageway.

In accordance with another feature of the invention, the member may be provided with an annular groove.

In accordance with the foregoing, clutch plate seals may be easily and quickly tested to determine whether or not they are defective by inserting the device of the present invention in the clutch drum passageway and introducing fluid under pressure to the member through the hole therethrough.

The above described and other advantages of the present invention will be better understood from the following description when considered in connection with the accompanying drawing.

In the drawing which is to be regarded as merely illustrative:

FIG. 1 is a perspective view of a conventional clutch drum of an automatic transmission of an automobile;

FIG. 2 is a side elevational view of a tool constructed in accordance with the present invention;

FIG. 3 is a longitudinal sectional view of the tool taken on the line 3—3 shown in FIG. 2; and FIG. 4 is a transverse sectional view of the tool taken on the line 4—4 shown in FIG. 3.

In the drawings in FIG. 1, a conventional automatic transmision clutch drum 12 is shown in perspective. It is an object of the present invention to test this clutch drum. The clutch drum incorporates a plate movable in contact with hydraulic seals, movement of the plate is resisted by a coiled compression spring. The plate is moved by introducing fluid under pressure through circumferentially spaced ports indicated at 10 and 11, in an internal cylindrical wall of the clutch drum. All portions of the clutch drum shown in FIG. 1 are symmetrical about the axis thereof with the exception of the spaced openings 10 and 11. Clutch drum 12 is provided with an internal shoulder at 13 as shown in FIG. 1 at the upper end of the internal cylindrical passage.

The testing tool of the present invention is indicated at 14 in FIGS. 2, 3 and 4. The tool includes a smaller cylindrical portion 15 and a larger cylindrical portion 16 having a shoulder 17 thereon to abut a face indicated at 18 on the clutch drum 12 shown in FIG. 1. Portion 15 of tool 14 is inserted inside the internal cylindrical passage 19 of the clutch drum 12. As shown in FIGS. 2 and 3, portion 15 of tool 14 is provided with an open annular groove 20 and annular grooves at 21 and 22 in which O-rings at 23 and 24 are positioned respectively. Portion 14 of tool 14 has a centrally located internal cylindrical passageway 25 extending therethrough. Passageway 25 also extends centrally through portion 15 of tool 14 to the position of a transverse cylindrical hole 26 therethrough. Passageways 25 and 26 are in free and open communication with one another.

When portion 15 of tool 14 is inserted in passageway 19, O-rings 23 and 24 come to rest against the cylindrical surface of passageway 19 on opposite sides of openings 10 and 11 therein. Air or a hydraulic fluid is then admitted under pressure to the right end of passageway 25 as viewed in FIG. 3. This fluid then emanates from the ends of hole 26 and flows around portion 15 of tool 14 in groove 20 until the same finds the openings 10 and 11 in clutch drum 12. Fluid is then introduced into clutch drum 12 through openings 10 and 11 and the seals of the movable plate therein are tested to the extent that they may be inspected to determine whether or not a fluid leak exists.

Normally, if the plate is actuated and the compression spring is compressed, the clutch drum 12 is in satisfactory operating order. The plate generally will not compress the spring if a leak in the plate seals exist or if the plate has become stuck inside the housing of the drum 12. Movement of the plate and compression of the spring may both be determined by inspection of the end of clutch drum 12 opposite that shown in FIG. 1.

A shoulder 17' may be provided on tool 14 to abut shoulder 13 on clutch drum 12, if desired. Alternatively, one of the shoulders 17 and 17' may be omitted.

From the foregoing, it will be appreciated that the tool 14 may be inserted in passageway 19 of clutch drum 12 in a position such that O-rings 23 and 24 will rest on opposite sides of spaced circumferential holes 10 and 11 with shoulder 17 of portion 16 of tool 14 abutting end face 18 of clutch drum 12. Shoulder 17 thus quickly and accurately locates O-rings 23 and 24 in appropriate positions. Still further, the annular groove 20 makes it possible to introduce fluid under pressure through passageways 25 and 26 outwardly in the space between the outer cylindrical surface of portion 15 and the internal surface of passageway 19 and in the space between O-rings 23 and 24 in a manner such that the same may be introduced through spaced holes 10 and 11 without considerably restricting the flow of such fluid.

Thus, in accordance with the present invention, clutch drum seals may be easily and quickly tested with the tool of the present invention to determine whether or not the same are defective. Although one specific embodiment of the invention has been shown and described herein, the many changes and modifications thereof will of course suggest themselves to those skilled in the art. Thus, the invention is not to be limited to the single specific embodiment selected for this disclosure, because the same has been so selected for the purpose of illustration only, the true scope of the invention being defined only in the appended claims.

What is claimed is:

1. A device to fit in a cylindrical passageway in a body, said passageway having circumferentially spaced holes therein, said holes being spaced from one end face of said body, said device comprising: a cylindrical member having a portion of a size to fit inside said passageway; resilient means to seal the circumference of said member to said passageway at two axially spaced points along the length of said member, said member having a hole therethrough extending from one end thereof outwardly thereof at a position between said resilient means; and stop means on said member to engage said body at a position of said member in said passageway such that said resilient means are positioned on opposite sides of said spaced holes.

2. A device to fit in a cylindrical passageway in a body, said passageway having circumferentially spaced holes therein, said holes being spaced from one end face of said body, said device comprising: a cylindrical member having a portion of a size to fit inside said passageway; resilient means to seal the circumference of said member to said passageway at two axially spaced points along the length of said member, said member having a hole therethrough extending from one end thereof outwardly thereof at a position between said resilient means, said member having an annular groove extending completely around the circumference of said member in a position between said resilient means, said hole through said member extending outwardly thereof at the position of said groove; and stop means on said member to engage said body at a position of said member in said passageway such that said resilient means are positioned on opposite sides of said spaced holes.

3. A device to fit in a cylindrical passageway in a body, said passageway having circumferentially spaced holes therein, said holes being spaced from one end face of said body, said device comprising: a cylindrical member having a first portion at one end of a first diameter to fit inside said passageway and a second portion at the other end of a second diameter larger than said first diameter, said first portion having two axially spaced annular end grooves therearound and an intermediate groove therearound positioned between and in spaced relation to said end grooves, said member having a longitudinal hole extending entirely through said second portion, said member having a transverse hole extending completely through said first portion at the axial position of said intermediate groove, said longitudinal hole intersecting said transverse hole, said second portion being located relative to said end grooves in a manner such that said end grooves lie on opposite sides of said spaced holes in said passageway when an end of said second portion abuts said body end face; and an O-ring in each of said end grooves to seat against said passageway on opposite sides of said spaced holes.

References Cited by the Examiner

UNITED STATES PATENTS

| 2,696,730 | 12/54 | Justice | 73—40 |
| 2,840,262 | 6/58 | Learmonth | 220—46 |

FOREIGN PATENTS

| 1,049,124 | 1/59 | Germany. |
| 201,435 | 8/23 | Great Britain. |

ISAAC LISANN, *Primary Examiner.*